(12) United States Patent
Allen

(10) Patent No.: US 11,428,053 B1
(45) Date of Patent: Aug. 30, 2022

(54) SYSTEM FOR CONNECTING PIPING SYSTEMS FOR HYDRAULIC FRACTURING OF OIL AND GAS WELLS

(71) Applicant: Performance Wellhead and Frac Components, LLC., Houston, TX (US)

(72) Inventor: Jack Allen, Porter, TX (US)

(73) Assignee: VAULT PRESSURE CONTROL, LLC, Houston, TX (US)

(*) Notice: Subject to any disclaimer, the term of this patent is extended or adjusted under 35 U.S.C. 154(b) by 0 days.

(21) Appl. No.: 17/016,323

(22) Filed: Sep. 9, 2020

Related U.S. Application Data

(60) Provisional application No. 62/897,449, filed on Sep. 9, 2019.

(51) Int. Cl.
| | | |
|---|---|---|
| *F16L 27/08* | (2006.01) |
| *E21B 17/042* | (2006.01) |
| *F16L 23/032* | (2006.01) |
| *F16L 43/00* | (2006.01) |
| *E21B 43/26* | (2006.01) |

(52) U.S. Cl.
CPC ........ *E21B 17/042* (2013.01); *E21B 43/2607* (2020.05); *F16L 23/032* (2013.01); *F16L 27/0841* (2013.01); *F16L 27/0845* (2013.01); *F16L 43/00* (2013.01)

(58) Field of Classification Search
CPC .......................... F16L 27/0841; F16L 27/0845
USPC ...................................... 285/387, 388, 147.1
See application file for complete search history.

(56) References Cited

U.S. PATENT DOCUMENTS

| | | | | |
|---|---|---|---|---|
| 323,834 A | * | 8/1885 | Turner ................ | F16L 27/0845 285/147.1 |
| 904,673 A | * | 11/1908 | Bideker .............. | F16L 27/0812 285/332.3 |
| 1,186,325 A | * | 6/1916 | Metzger ................ | F16L 15/006 285/388 |
| 2,879,083 A | * | 3/1959 | Corsette ............. | F16L 27/0832 285/147.1 |
| 3,476,414 A | * | 11/1969 | Condrac ............. | F16L 19/0206 285/369 |
| 3,532,364 A | * | 10/1970 | Snyder, Jr. ......... | F16L 27/0824 285/351 |

(Continued)

*Primary Examiner* — David Bochna
(74) *Attorney, Agent, or Firm* — Morgan, Lewis & Bockius LLP

(57) ABSTRACT

In various implementations, a hydraulic fracturing piping system may include one or more rotatable elbows to connect other components of the hydraulic fracturing piping system. Using rotatable elbows may facilitate connections in the hydraulic fracturing piping system. For example, when using a rotatable elbow, in the assembly of the system, the rotatable elbow may be capable of rotating to different positions to facilitate alignment of the hydraulic fracturing manifold and hydraulic fracturing stack (e.g., christmas tree), when the hydraulic fracturing manifold and the hydraulic fracturing stack are not in alignment. In some implementations, the elbow may include an internal radial transition (e.g., of approximately 90 degrees) to control the media being injected into the wellbore. The internal radial transition of the elbow may create a more uniform media flow and/or less turbulence, which may significantly reduce erosion of the inner surfaces the bore of the elbow.

10 Claims, 7 Drawing Sheets

(56) References Cited

U.S. PATENT DOCUMENTS

| | | | | |
|---|---|---|---|---|
| 4,229,024 A * | 10/1980 | Oberrecht | | F16L 27/0845 |
| | | | | 285/98 |
| 4,258,936 A * | 3/1981 | Goldberg | | F16L 47/04 |
| | | | | 285/388 |
| 4,549,756 A * | 10/1985 | Basile | | F16L 19/00 |
| | | | | 285/388 |
| 4,620,728 A * | 11/1986 | Barth | | F16L 27/0824 |
| | | | | 285/14 |
| 5,362,109 A * | 11/1994 | Pacht | | F16L 19/0206 |
| | | | | 285/388 |
| 5,409,066 A * | 4/1995 | McHugh | | F16L 27/0841 |
| | | | | 169/52 |
| 6,557,905 B2 * | 5/2003 | Mack | | F04D 29/044 |
| | | | | 285/388 |
| 6,832,790 B2 * | 12/2004 | Olson | | F16L 19/0218 |
| | | | | 285/388 |
| 8,656,990 B2 | 2/2014 | Kajaria et al. | | |
| 8,696,039 B2 * | 4/2014 | Guidry | | E21B 33/038 |
| | | | | 285/388 |
| 8,813,836 B2 | 8/2014 | Kajaria et al. | | |
| 8,839,867 B2 | 9/2014 | Conrad | | |
| 8,978,763 B2 | 3/2015 | Guidry | | |
| 9,068,450 B2 | 6/2015 | Guidry | | |
| 9,222,345 B2 | 12/2015 | Conrad | | |
| 9,255,469 B2 | 2/2016 | Conrad | | |
| 9,518,430 B2 | 12/2016 | Guidry | | |
| 9,631,469 B2 | 4/2017 | Guidry et al. | | |
| 9,903,190 B2 | 2/2018 | Conrad et al. | | |
| 9,932,800 B2 | 4/2018 | Guidry | | |
| 10,094,195 B2 | 10/2018 | Guidry | | |
| 10,385,643 B2 | 8/2019 | Guidry | | |
| 10,385,645 B2 | 8/2019 | Guidry | | |
| 10,487,637 B2 | 11/2019 | Guidry et al. | | |
| 10,876,371 B2 | 12/2020 | Guidry | | |
| 2018/0187507 A1 | 7/2018 | Hill et al. | | |
| 2018/0187537 A1 | 7/2018 | Hill et al. | | |
| 2018/0187662 A1 | 7/2018 | Hill et al. | | |
| 2018/0291718 A1 | 10/2018 | Conrad et al. | | |

* cited by examiner

SYSTEM FOR CONNECTING PIPING SYSTEMS FOR HYDRAULIC FRACTURING OF OIL AND GAS WELLS

CROSS-REFERENCE TO RELATED APPLICATION

This application claims the benefit of U.S. Provisional Patent Application No. 62/897,449 entitled "SYSTEM FOR CONNECTING PIPING SYSTEMS FOR HYDRAULIC FRACTURING OF OIL AND GAS WELLS" filed on Sep. 9, 2019, which is incorporated by reference for all purposes.

TECHNICAL FIELD

The present invention relates to connections between piping systems for oil and gas wells.

BACKGROUND

Conventional hydraulic fracturing piping systems utilize a plurality of threaded and/or coupled connections. As common with piping systems, fittings such as elbows and/or tees may be used to connect lengths of pipe. However, mating may be more difficult due to the nature of the configuration of hydraulic fracturing assemblies. For example, hydraulic fracturing manifold and hydraulic fracturing stacks or christmas trees may not align perfectly. This misalignment may make coupling more difficult.

SUMMARY

In various implementations, the hydraulic fracturing piping system may include a plurality of tubular members joined together by a combination of threaded and flanged connections, such as elbows. The hydraulic fracturing piping system may allow flow of high pressure fracturing media from a hydraulic fracturing manifold into the well bore through the wellhead assembly. Flow control in a piping system may obtain safe, flexible and/or reliable operations of high pressure oilfield hydraulic fracturing system. This control may be achieved, at least in part, by utilizing a plurality of threaded and flanged rotating members.

In some implementations, rotatable connection members such as rotatable elbows (e.g., 90 degree elbows, 45 degree elbows, etc.) and/or inline connections (e.g., flanged rotating members) may accommodate mating between the wellhead christmas tree and the hydraulic fracturing manifold. An elbow and/or flanged rotating member may rotate to allow the inlet and/or outlet of the elbow and/or flanged rotating member to be disposed in different positions to facilitate alignment with the flanged connections of a hydraulic fracturing manifold and/or a hydraulic fracturing christmas tree. For example, bolting between components may require a specific orientation (e.g., such that openings that receive bolts align), rotation of a rotatable connecting member may facilitate such bolting. As another example, components of a hydraulic fracturing system may be imperfectly aligned and utilizing rotating coupling members may ease coupling between imperfectly aligned components.

In various implementations, the rotating connecting member (e.g., flanged rotating connecting member and/or elbow) may include a first end and a second end. The first end and/or second end may correlate to an inlet and/or outlet based on the direction of media flow through the rotating connection member. The rotating connecting member may include, proximate the first end, a male connector and an internally threaded nut disposed about at least a portion of the male connector. The internally threaded nut may be retained on the rotating connecting member by an internally threaded retainer, which is coupled to the rotating connecting member. For example, threads disposed on an inner surface of the internally threaded retainer may at least partially couple with threads disposed on an external surface of the rotating connecting member (e.g., on and/or proximate the male connector of the rotating connecting member). The second end of the rotating connecting member may or may not include a similar male connector and internally threaded nut. For example, the second end of the rotating connecting member may include a flange, a female connector capable of coupling with the male connector of another rotating connecting member, and/or any other appropriate coupling member.

In some implementations, the rotatable elbow and/or flanged rotating member may be a body with one or more threaded connections. The body of the rotatable elbow and/or flanged rotating member may include male end connectors, female end connectors, internal seals, a retainer and/or a nut. The elbow may include flanged rotating members. The rotatable elbow may facilitate coupling between components of the hydraulic fracturing piping system while maintaining operation parameters for the hydraulic fracturing piping system (e.g., allow flow of high pressure hydraulic fracturing media to pass safely through the assembly from the hydraulic fracturing manifold into the well bore of the christmas tree).

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following.

Like reference symbols in the various drawings indicate like elements.

DETAILED DESCRIPTION

Figure 1:
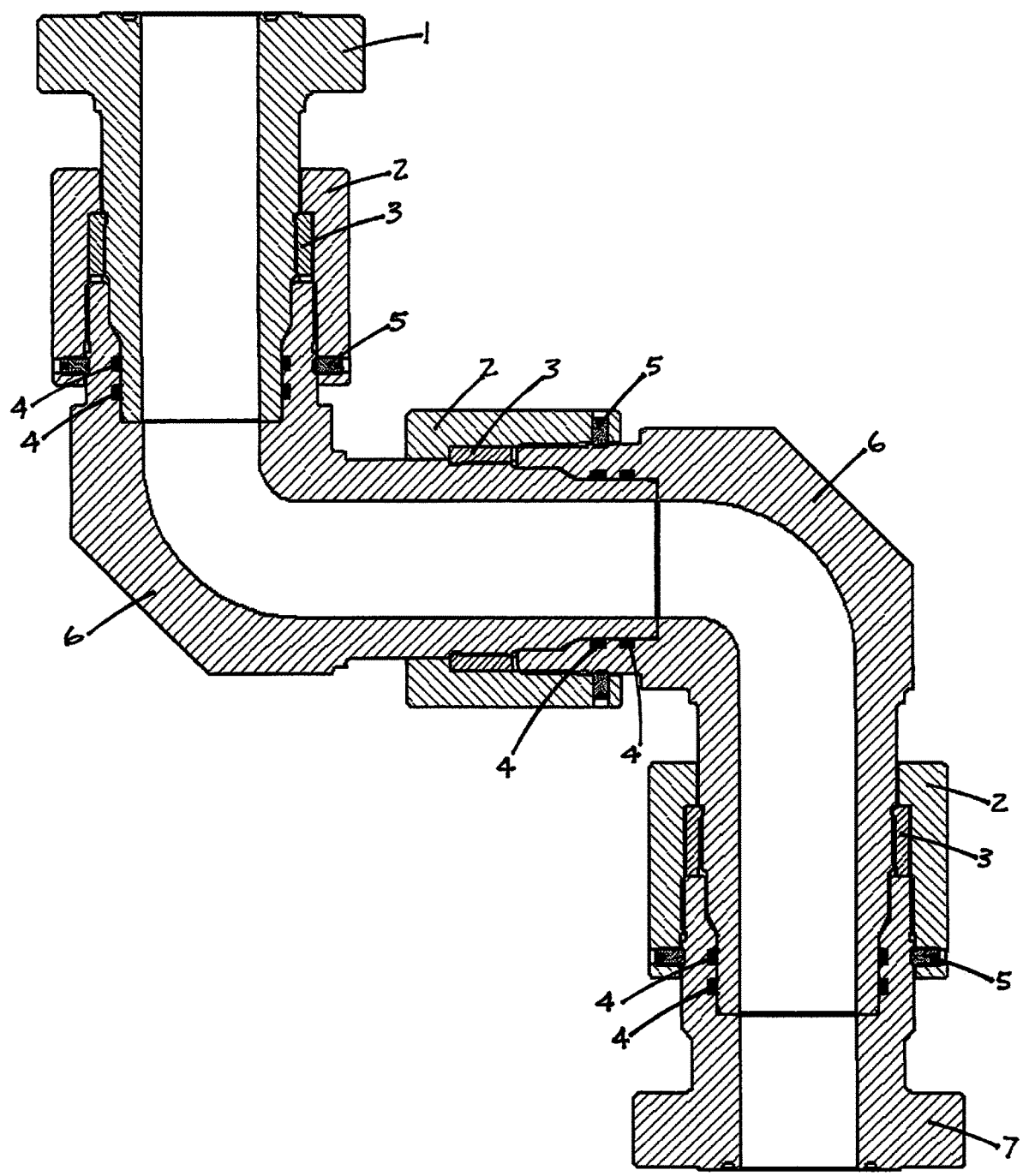
FIG. 1 illustrates cross-sectional view of an implementation of an embodiment of a portion of a hydraulic fracturing.

In various implementations, a hydraulic fracturing piping system and/or components thereof may be utilized in oil and gas well production. The assembly may allow high pressure flow to enter the wellbore, pass downward through the well bore, enter the oil or gas formation and fracture the formation producing small cracks or perforations in the formation. At least in part, these small cracks and/or perforations may allow the passage of oil or gas into the well bore after hydraulic fracturing has been completed.

In various implementations, the hydraulic fracturing piping system may include a variety of components such as lengths of pipe and connecting members that facilitate coupling of the members and/or facilitate specific arrangements of the lengths of pipe (e.g., turns, angles, etc.). The connecting members may include flanged rotating members and/or elbows (e.g., 90 degree, 60 degree, 30 degree, etc.). The flanged rotating members and/or elbows may include threaded nuts and/or nut retainers that facilitate coupling between flanged rotating members, elbows, and/or other components of the hydraulic fracturing piping system.

FIGS. 1-6 illustrates an implementation of a portion of a hydraulic fracturing piping system that includes rotating connecting members such as flanged rotating members 1, 7 and elbows 6. The flanged and elbow members may be used together or separately in coupling portions of the hydraulic fracturing piping system. The set of elbow bodies (e.g., 90 degree elbows with an internal bore that includes an angle of approximately 90 degrees) may be coupled together and coupled to flanged rotating members, as illustrated.

In various implementations, a rotating connecting member may include male connector and a threaded nut disposed about at least a portion of the male connector. As illustrated, the threaded nut 2 is retained on the body of the rotating connecting member 1, 7 by a threaded retainer 4, which is coupled to the rotating connecting member 1,7. A female connector on an end of another rotating connecting member at least partially receives this male connector to couple the rotating connecting members together. The threaded nut allows the rotation of the rotating connecting members to ease connection and thus user satisfaction.

Figure 4:
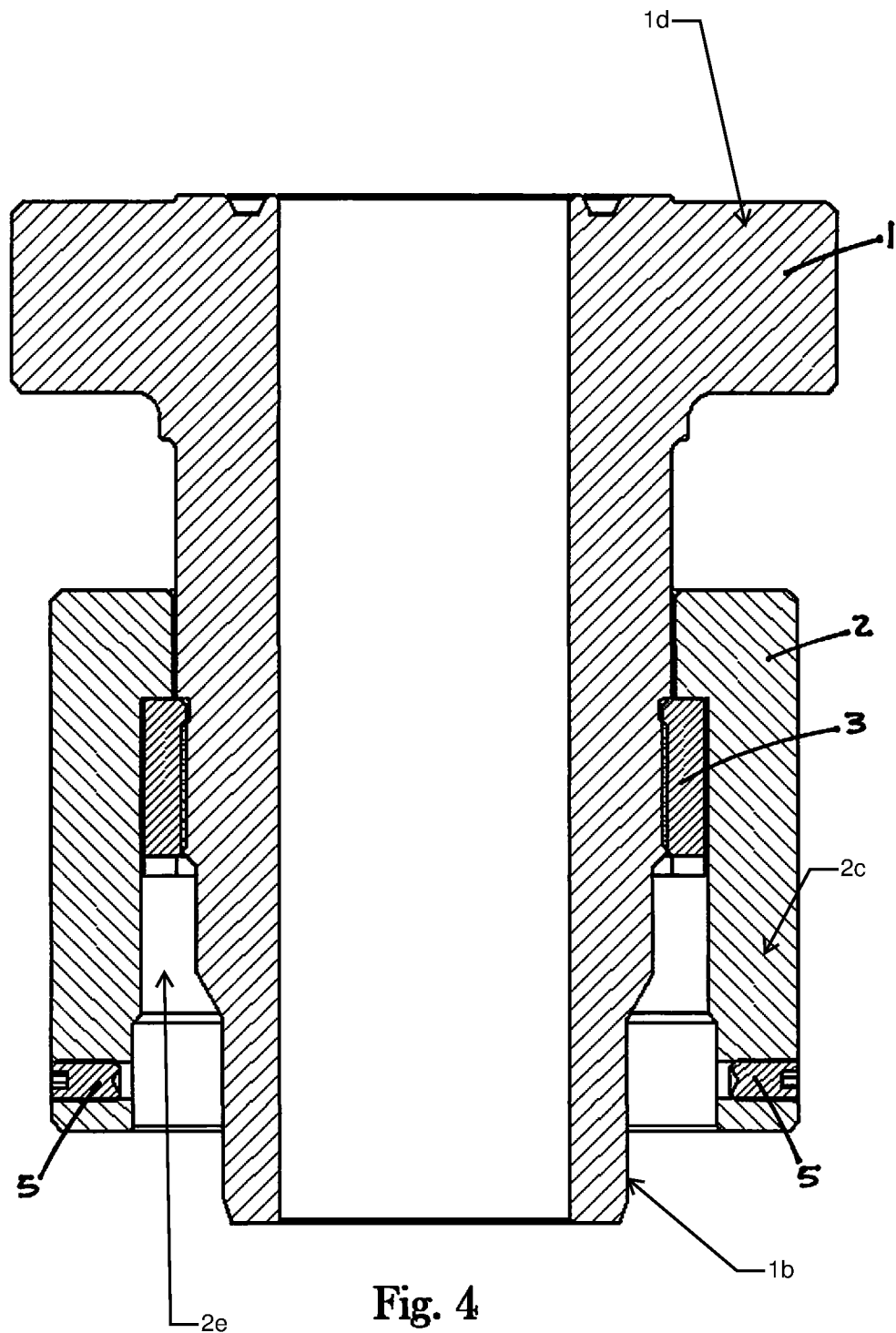
FIG. 4 illustrates a cross-sectional view of an implementation of an embodiment of a flanged rotating member.
Figure 5:
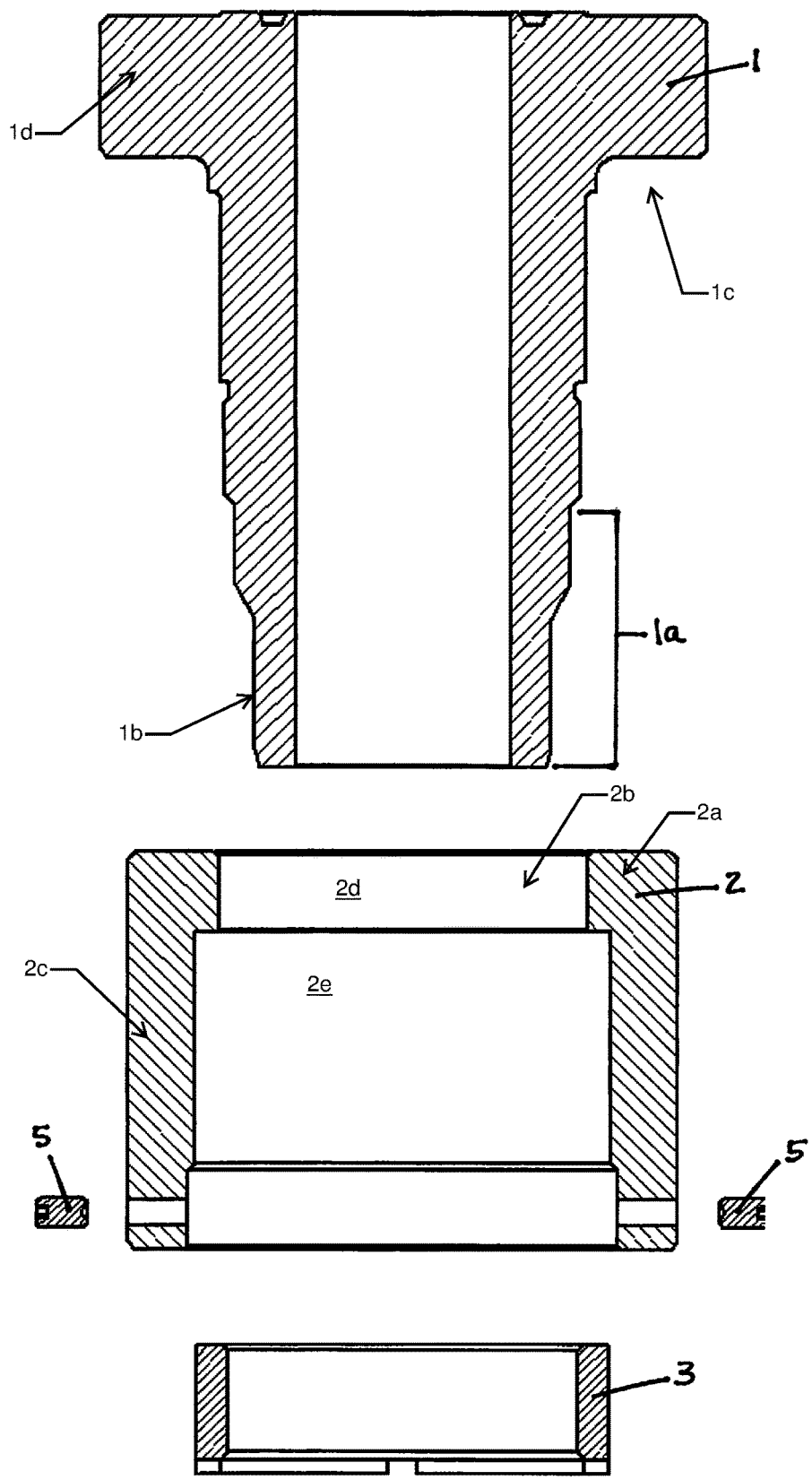
FIG. 5 illustrates a cross-sectional, exploded view of an implementation of the embodiment of the flanged rotating member, illustrated in FIG. 4.

FIG. 4 illustrates a cross-section of an implementation of a flanged rotating member 1 and FIG. 5 illustrates a cross-sectional, exploded view of the implementation of the flanged rotating member 1. The flanged rotating member 1 may include a male connector 1*a* proximate a first end 1*b* of the flanged rotating member. The male connector may be a narrower portion of the flanged rotating member, in some implementations. The second end 1*c* may include a flange 1*d*. The flange 1*d* may include openings that are capable of receiving fasteners (e.g., to couple the flanged rotating member to a portion of the hydraulic fracturing piping system via the openings in the flange 1*d*). Since the flanged rotating member can rotate, the alignment of the openings on the flange with openings on a portion of the hydraulic fracturing piping system may be eased (e.g., when compared with fixed connection systems).

An internally threaded nut 2 may be disposed about the first end of the body of the flanged rotating member 1 (e.g., proximate the male end). The threaded nut 2 may include a base 2*a* with an aperture 2*b* and one or more arms extending from the base. The arm(s) may be an annular collar 2*c* extending from the base, in some implementations. A cavity may reside between the arm(s) and the base. At least a portion of the cavity may be threaded. For example, the cavity may include two sections, a first section 2*d* to receive a retainer 3 and a second section 2*e* to receive a female connector of another rotating or non-rotating member. The second section may include threads to couple with the female connector received in the cavity of the nut 2. The first section may or may not be threaded. For example, the first section 2*d* of the cavity may not be threaded to ease insertion of the retainer in the cavity.

Figure 6:
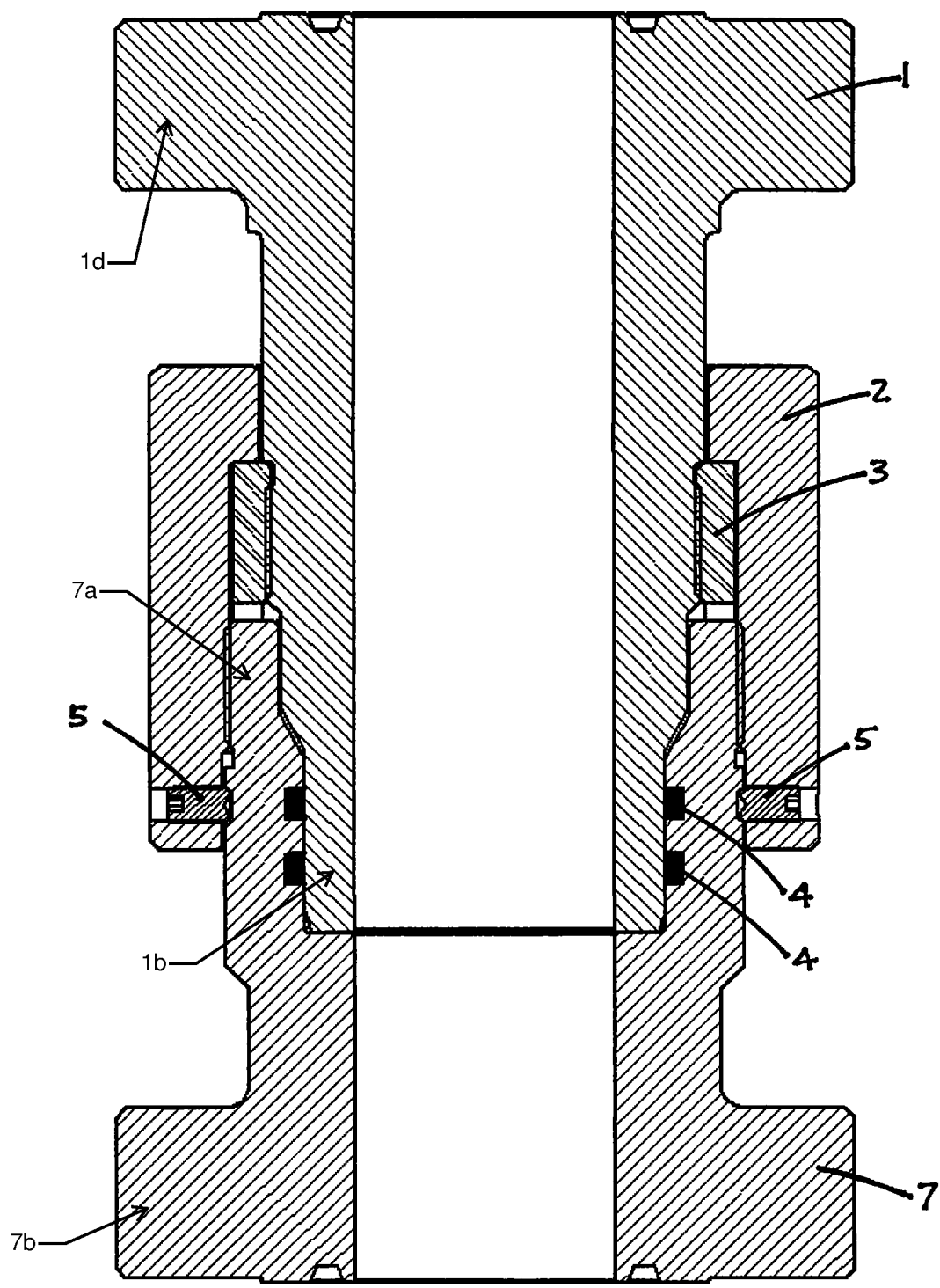
FIG. 6 illustrates a cross-sectional view of an implementation of an embodiment of a portion of a hydraulic fracturing piping system comprising a set of flanged rotating members that are coupled.

The threaded nut 2 may be retained on the flanged rotating member 1 by threaded retainer 3. The threaded retainer 3 may include threads on at least a portion of its inner surface that are capable of coupling with threads on an external surface of the flanged rotating member 1 (e.g., proximate the first end and/or male connector). The threaded retainer may include threads on an interior surface and/or exterior surface. As illustrated in FIGS. 1 and 6, the male connector of flanged rotating member 1 may be received by and/or couple with a female connector of an elbow 6 or a flanged member 7.

A second end of the flanged rotating member 1 may include a flange, which is capable of coupling with other components of the hydraulic fracturing piping system (e.g., may include fasteners, openings to receive fasteners, etc.).

The flanged rotating member may include an internal bore through the flanged rotating member that allows fluid to flow into and/or out of the first and the second ends.

Figure 2:
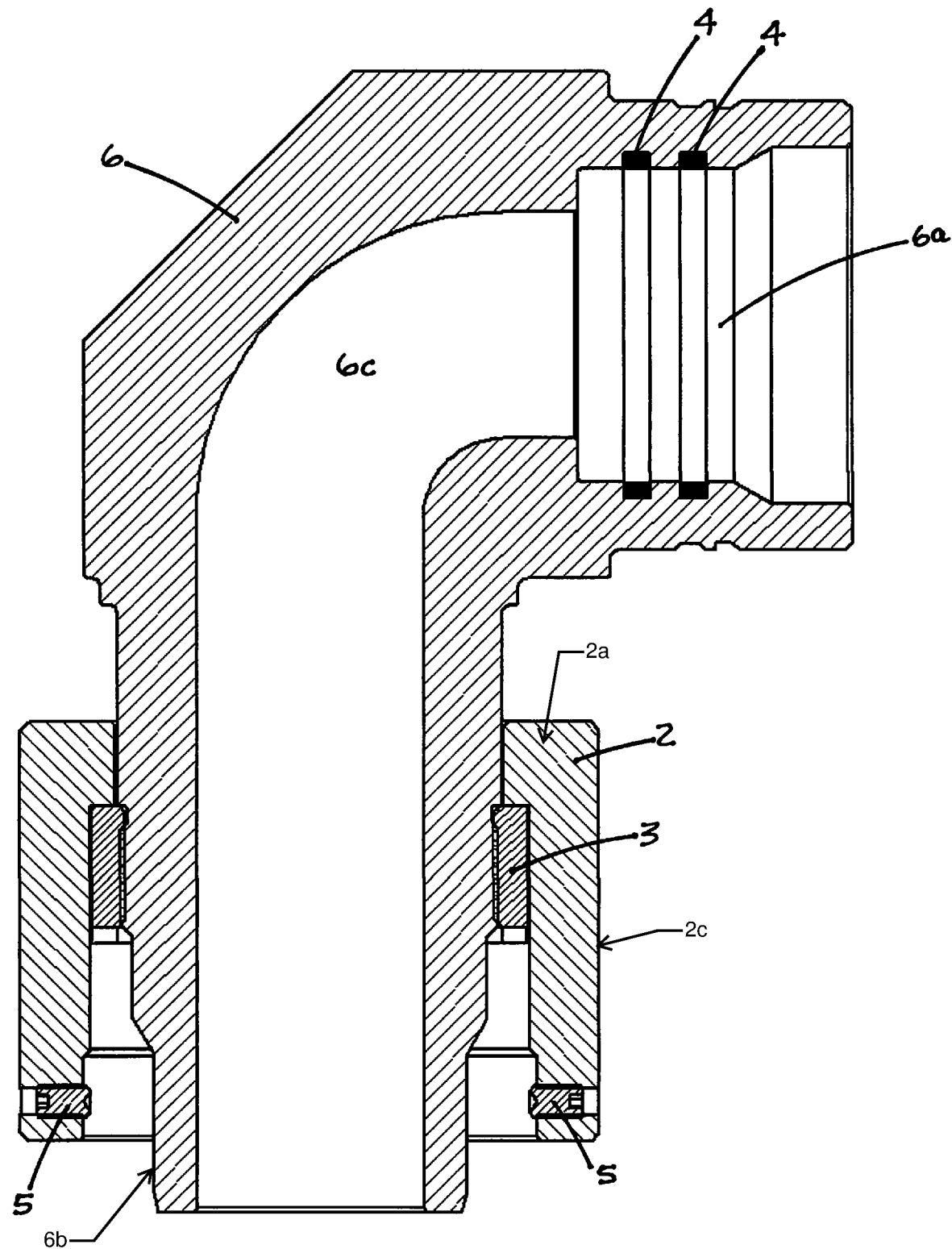
FIG. 2 illustrates a cross-sectional view of an implementation of an embodiment of a rotatable elbow.
Figure 3:
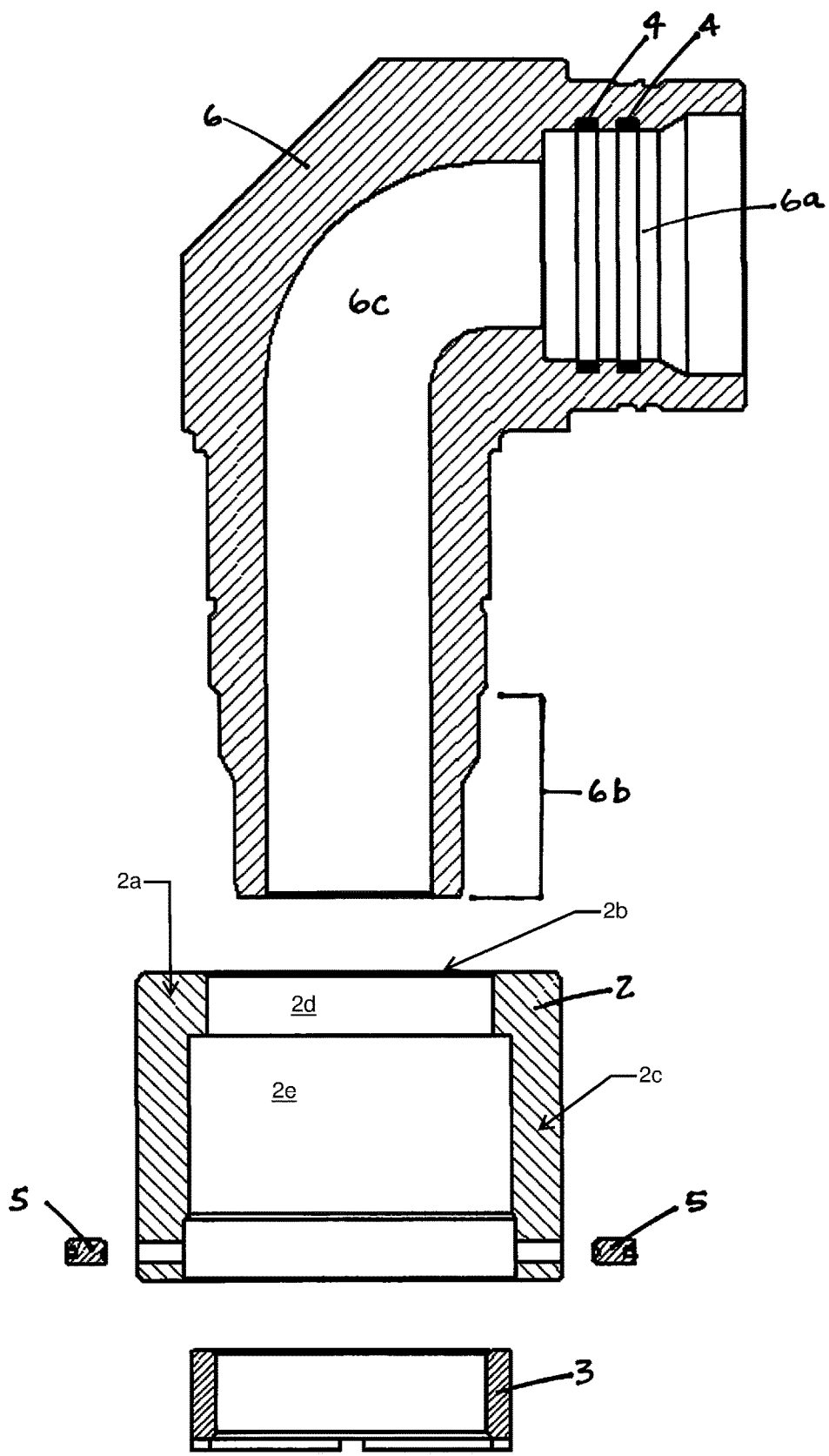
FIG. 3 illustrates a cross-sectional, exploded view of an implementation of the embodiment of the rotatable elbow, illustrated in FIG. 2.

FIG. 2 illustrates an implementation of an elbow 6 and FIG. 3 illustrates an exploded view of the elbow 6. As illustrated, the first end of elbow 6 may include a male connector 6*b*. The male connector may be a portion of the body of the elbow (e.g., a narrower portion, a wider portion, etc.). Elbow 6 may include a first end with a male connector and a second end with a female connector, as illustrated. In some implementations, an elbow may include a male connector (e.g., male connector, nut, and retainer) on both ends.

A threaded nut 2 may be disposed about the first end of the body of the elbow (e.g., proximate the male end). The nut 2 may include a base 2*a* and an aperture 2*b* disposed through the base and one or more arms extending from the base. The arm(s) may be an annular collar 2*c* extending from the base, in some implementations. A cavity may reside between the arm(s) and the base. At least a portion of the cavity may be threaded. For example, the cavity may include two sections, a first section 2*d* to receive a retainer 3 and a second section 2*e* to receive a female connector of another rotating or non-rotating member. The second section may include threads to couple with the female connector received in the cavity of the nut 2. The first section may or may not be threaded. For example, the first section 2*d* of the cavity may not be threaded to ease insertion of the retainer in the cavity.

The threaded nut 2 may be retained on the flanged rotating member 1 by threaded retainer 3. The threaded retainer may be an annular ring. The threaded retainer 3 may include threads on at least a portion of its inner surface that are capable of coupling with threads on an external surface of the flanged rotating member 1 (e.g., proximate the first end and/or male connector). The threaded retainer may include threads on an interior surface and/or exterior surface.

The threaded nut 2 (e.g., in flange 1 or elbow 6) may include one or more retainer fasteners, such as retainer screws 5. In some implementations, the elbow 6 may include one or more retainer screws 5. The threaded nut 2 may include one or more openings configured to receive the retaining screws 5. A retaining screw may be at least partially movable (e.g., slidable, screwable, etc.) within the opening of the threaded nut 2. The retaining screw 5 may be moved from at least one first position in which the retaining screw does not inhibit movement of a female connector of a rotatable connecting member in the threated nut 2 to at least one second position that inhibits movement of the female connector of the rotatable connecting member (e.g., to couple the rotatable connecting members together).

The second end of the elbow 6 may include a female connector 6*a* that is capable of receiving a male connector (e.g., 6*b* or 1*a*) of another rotatable connecting member (e.g., male connector of the flanged rotating member 1 and/or another elbow 6). The female connector 6a may include an aperture capable of receiving at least a portion of the male connector (e.g., 6b and/or 1a).

In some implementations, the elbow may include one or more elastomeric seals 4 proximate the female connector. The elastomeric seals may be disposed in the internal bore of the elbow proximate the female connector such that when the female connector receives at least a portion of a male connector of another rotatable connecting member, (e.g., male connector of flanged connection member 1), the elastomeric seals may contact the received male connector of the other rotatable connector and inhibit leaks (e.g., provide a connection without substantial leakage). In some implementations, the elastomeric seals may provide a pressure tight seal around the male connector of the other rotatable connector (e.g., flanged rotating member 1 and/or another elbow 6). An inner surface of the female connector of the elbow 6 may include one or more recesses to receive the elastomeric seal(s), in some implementations. In some implementations, the elastomeric seal may be at least partially compressed by insertion of the other rotatable connector to inhibit fluid leaks.

The elbow 6 may include an internal bore through the elbow that allows fluid (e.g., media) to flow into and/or out of the first and the second ends of the elbow.

The elbow 6 may include an internal radius bore 6c. The internal radius bore may be selected to provide specified flow properties through the internal bore. As illustrated, the internal bore 6c may be approximately 90 degrees.

FIG. 1 illustrates two coupled elbows 6. Although the elbows are illustrated with similar internal bore radii, in some implementations the elbows may have different internal bore radii. Thus, a rotatable connection system (e.g., one or more elbows and/or one or more flanged members) may include an internal bore that provides fluid flow between components, but the radii may or may not vary between components and/or sections of the components. As illustrated, the male connector of a first elbow may be received by and couple with the female connector of a second elbow.

Figure 7:
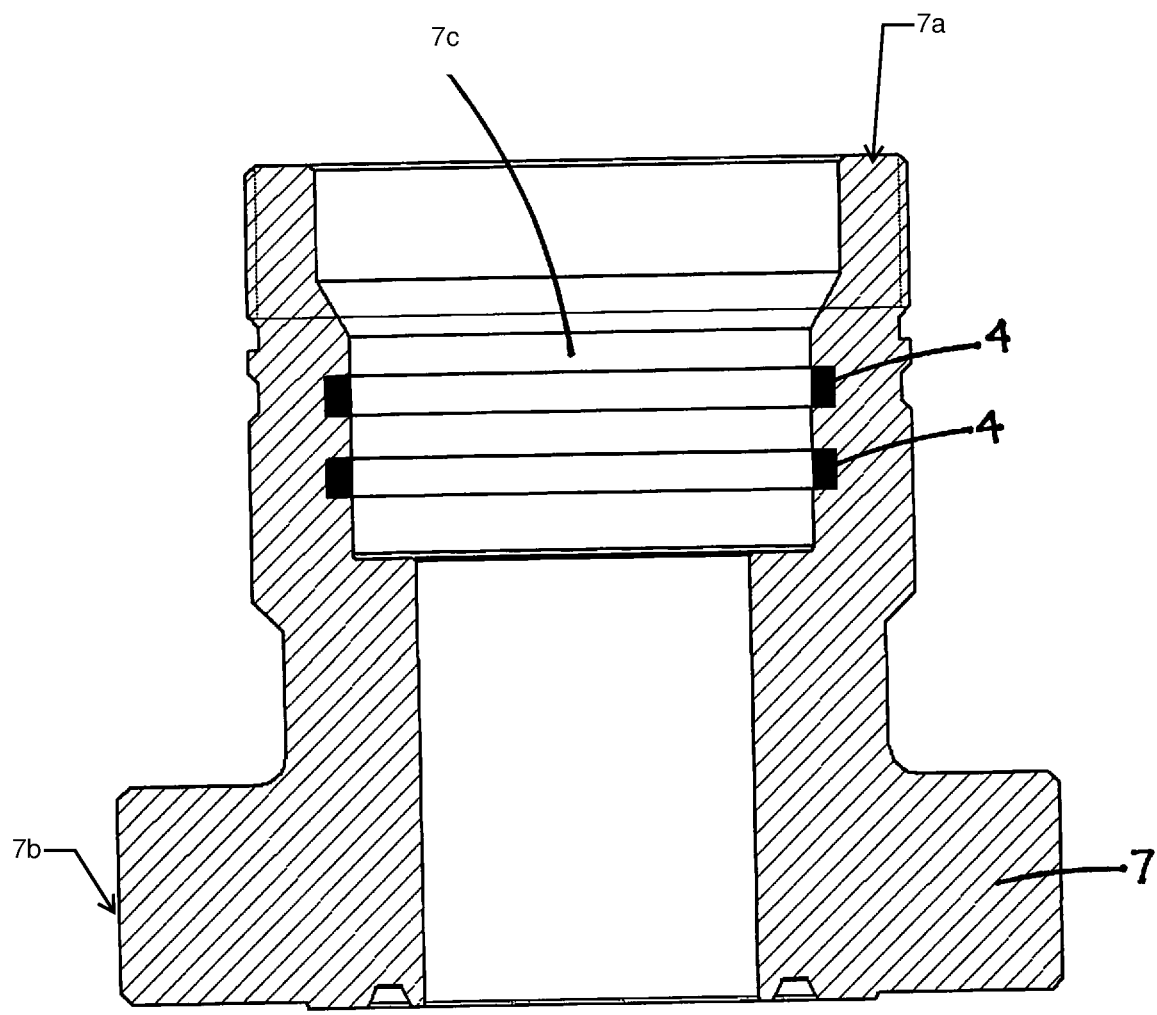
FIG. 7 illustrates a cross-sectional view of an implementation of an embodiment of a flanged rotating member that includes elastomeric seals.

The male connector of the second elbow may couple with the flanged rotating member 7 (e.g., a female connector of flanged rotating member). As illustrated in FIGS. 1 and 7, the flanged rotating member 7 may have a first end that includes female connector 7a and a second end that includes a flange 7b. The female connector may have an internal bore 7c disposed through the ends of the flanged rotating member 7. The flanged rotating member 7 may include one or more elastomeric seals 4 disposed in the female connector such that when a male connector of another rotating connecting member is at least partially received, the elastomeric seal(s) contact an external surface of the male connector of the other rotating connecting member and leaks are inhibited (e.g., a pressure tight seal around the other rotating connector is formed). For example, the fluid (e.g., media) may flow between the elbow and the rotating connecting member without substantial leakage external to the elbow and rotating connecting member. The internally threaded nut 2 of the second elbow may be retained by internally threaded retainer 3, which couples with threads on an external surface of the elbow 6. The internal threaded nut may engage with threads on an external surface of the flanged rotating member 7 to couple the elbow 6 and flanged rotating member 7. The threaded member 7 may or may not include openings on the flange 7b similar to the openings on flange 1 to facilitate coupling with other components of the hydraulic fracturing piping system.

FIG. 6 illustrates a cross-sectional view of an implementation of an embodiment of a portion of a hydraulic fracturing piping system that includes two coupled flanged rotating members. The first flanged rotating member 1 includes a first end with a male connector and a second end with a flange. The second flanged rotating member 7 a first end with a female connector and a second end with a flange. The male connector of the first flanged member 1 is at least partially received by the female connector of the second flanged member 7. The elastomeric seals 4 disposed in the second flanged member contact the first flanged member and create a seal that allows fluid communication between the internal bores of the two connecting members without substantial leakage. The elastomeric seals may inhibit leaks (e.g., by providing a pressure tight seal around the male connector of the first flanged rotating member 1). The threaded nut 2 of the first flanged connecting member 1 may at least partially receive the female member of the second flanged connecting member 7. The threaded nut 2 may be retained on the first flanged connecting member 1 by the internally threaded retainer 3. The internally threaded retainer 3 may couple with threads disposed on an exterior surface of the male connector and retain the threaded nut 2 on the first flanged connecting member 1. The threads on an internal surface of the threaded nut 2 may engage with at least a portion of the threads on an external surface of the female member of the second flanged connecting member 7. The retaining screws may contact at least a portion of an exterior surface of the female connector (e.g., a recess disposed in the surface) to couple the first and second flanged connecting members 1, 7.

In various implementations, a hydraulic fracturing system may include one or more rotatable coupling members. A rotatable coupling member may include a body with a first end and a second end. The ends may be opposing or not opposing. For example, the body may be straight or angled. A rotatable coupling member may include an internal bore. The internal bore may have a bore radius when the bore is angled. The end(s) of the rotatable coupling member may include a male connector, a female connector and/or a flange.

In some implementations, a first end of the rotatable coupling member may include a male connector and a threaded nut. The threaded nut may be disposed about the body of the rotatable coupling member, such as disposed about the male connector. For example, the threaded nut may include an opening and the body of the rotatable coupling member may be disposed through the opening. The threaded nut may be retained on the body of the rotatable coupling member by an internally threaded retainer. The internally threaded retainer may be disposed about the body of the rotatable coupling member. The internal threads of the internally threaded retainer may couple with threads on an exterior surface of the body of the rotatable coupling member. The exterior surface of the internally threaded retainer may contact the threaded nut and inhibit the threaded nut from uncoupling from body of the rotatable coupling member. The threaded nut may include one or more openings through a wall of the threaded nut and disposed radially about the threaded nut. An opening in the threaded nut may be configured to receive a retaining fastener (e.g., retaining screw). The retaining fastener may be positionable in more than one position by moving through the opening (e.g., a locked and open position).

In some implementations, a second end of a rotatable coupling member may include a female connector. The female connector may include a recess and/or orifice to receive at least a portion of a male connector (e.g., of another rotatable connector). The female connector may include one or more gaskets (e.g., elastomeric seals). The female connector may include recess(es) disposed in an inner surface of the second end (e.g., in the recess and/or orifice) to receive at least a portion of the gasket. When receiving a male connector (e.g., of another rotatable coupling member), the gaskets may contact an exterior surface of the male connector and form a seal that allows media flow from the internal bore of the rotatable coupling member to the internal bore of another rotatable coupling member to which it is sealed while inhibit leaks (e.g., exterior to the piping).

When connecting a male connector of a first rotatable coupling member to a female connector of a second rotatable coupling member. The male connector of the first rotatable coupling member is inserted at least partially into the female connector. While the gasket may retain and/or seal the connection of the inner bores of the first and the second rotatable coupling members, rotation between the first and the second rotatable coupling members may not be inhibited. Thus, the first and the second rotatable coupling members may be rotated to a specific orientation relative to each other. To lock the rotation, the threaded nut may then be screwed onto the female connector. For example, the threads on an inner surface of the threaded nut may engage with at least a portion of the threads on an external surface of the female member. The retaining fasteners in the threaded nut may then disposed in a locked or second position that inhibits uncoupling of the first and second rotatable coupling members. The process may be reversed to unlock the first and the second rotatable coupling members.

In some implementations, the rotatable coupling member may be an elbow with a male connector at a first end and a female connector at a second end. The rotatable coupling member may be an elbow with a male connector at one end and a fixed connector at the second end (e.g., a non-rotatable connector). The rotatable coupling member may be an elbow with a female connector at one end and a fixed connector at the second end (e.g., a non-rotatable connector). The rotatable coupling member may include a flange in some implementations. The rotatable coupling member may include a flange at one end and a male connector at the other end. The rotatable coupling member may include a flange at one end and a female connector at the other end.

In various implementations, a rotatable connection member system of a hydraulic fracturing piping system may couple components of a hydraulic fracturing piping system. The rotatable connection system may include one or more rotatable connections, such as elbow bodies and/or flanges. The elbow(s) and/or flange(s) may be coupled to each other to form the rotatable connection member system. In some implementations, the elbow(s) and/or flange(s) may be used independently as the rotatable connection member system. In some implementations, an elbow may include a flanged end for use in direct connections to the hydraulic fracturing piping system.

The rotatable connection member system may have two ends and at least one end may allow rotation to facilitate alignment with other components of the hydraulic fracturing piping system and/or other rotatable connection member system(s). The rotatable connection member system may have the ability to rotate components relative to each other to facilitate alignment with other components of the hydraulic fracturing piping system. For example, when a flange and an elbow are coupled, the flange and elbow may be able to rotate relative to each other (e.g., to allow the orientation of an end of an elbow to change and/or to allow openings in a flange to rotate positions about the bore of the flange). As another nonlimiting example, when two or more elbows are coupled, the elbows may be able to rotate relative to each other (e.g., to allow the orientation of an end of an elbow to change) and/or to allow openings in a flange of an elbow, if present, to rotate positions about the bore of the flange. As another nonlimiting example, when two or more flanges are coupled, the flanges may be able to rotate relative to each other to allow openings in a flange to rotate position about the bore of the flange.

In various implementations, the female end of rotatable connectors (e.g., flange and/or elbow) may be adapted to couple with a male end of a similar or different connector (e.g., rotatable flange, rotatable elbow, or other connector). The male end of rotatable connectors (e.g., flange and/or elbow) may be adapted to couple with a female end of a similar or different connector (e.g., rotatable flange, rotatable elbow, or other connector).

In various implementations, a component a rotatable connection system may include an elbow. The elbow (e.g., an elbow member of the rotatable connection system) may include a first body. The first body may include a first end and a second end. The second end may include a male connector. The male connector of the second end may include threads on a portion of an outer surface of the male connector. The elbow body may include an internal bore disposed that extends from the first end to the second end. A nut may be disposed about the male connector and/or second end. The nut may include a base. The base of the nut may include a first aperture through the base and at least one arm extending from the base. At least a portion of the at least one arm comprises threads (e.g., configured to couple with a female connector of an other connector). The nut may include a cavity disposed between the at least one arm and the base and an opposing inner side. A retainer may be disposed between the nut and the male connector, in some implementations to inhibit the nut from uncoupling from the elbow body. The retainer may include a second aperture through a base of the retainer and a portion of the second aperture may include threads configured to couple with the threads of the elbow body. The retainer may be disposed in the cavity of the nut and may or may not contact an inner surface of the nut. The retainer may include a smooth exterior to rotate freely in the nut, in some implementations. Coupling the retainer to the elbow body inhibits release of the nut from the body (e.g., to inhibit loss, ease coupling/uncoupling, etc.).

A female connector of the elbow body may include an aperture configured to receive a male connector (e.g., of another elbow, flange, and/or other component of the hydraulic fracturing piping system). The aperture may not be threaded in some implementations, to ease mating of components. The aperture may include an inner bore and elastomeric seal(s) or other types of gasket(s) disposed in the inner bore proximate the female connector. The inner bore may include one or more recesses to receive at least a portion of the elastomeric seal(s) and/or other types of gasket(s). The elastomeric seal may at least partially compress upon insertion of the male connector into the female connector. The elastomeric seals or other types of gaskets may inhibit leaks when a male connector is received by the aperture of the female connector in the inner bore. In some implementations, the bore may have a greater radius in the female connector than other portions of the body.

Implementations may include one or more of the following features. A male connector may include an outer diameter that is smaller than the outer diameter of a different portion of the body of the connector. The first end may be a male or a female connector. The first end may include a flange. The flange may include one or more openings disposed radially about the flange. The openings of the flange may be capable of receiving fastener(s) to couple the flanged member with a portion of the hydraulic fracturing piping system. The first end may or may not be disposed in an opposite direction as the second end (e.g., the elbow may be 90 degrees, 60 degrees, 360 degrees, etc.). The arm(s) of the nut disposed about the male connector may include an annular collar extending from the base. The body is elbow shaped. The nut may include one or more openings to receive one or more retainer fasteners. Retainer fastener(s) may inhibiting movement of an other connector coupled to the rotatable connection member by contacting the other connector through the one or more openings in the nut (e.g., a retainer fastener may extend through an opening in the nut to contact an other connector an inhibit movement; the retainer fastener may be removed at least partially from the opening such that the other connector can move). The retainer fastener(s) may be retainer screw(s). In some implementations, a retainer may not be utilized.

In various implementations, the rotatable connection member may have linear body rather than an elbow body. The linear rotatable connection member may or may not be flanged. The linear rotatable connection member may include a first end and a second end. The first end may include female and/or male connectors. In some implementations, the first end may include a flange in place of or in addition to a connector. As illustrated, in FIG. 1, the linear body may include a first end with a flange and without a female or male connector. The absence of a connector may ease connection between components of the hydraulic fracturing piping system (e.g., since allowing fluid flow between components may be a simpler mating than fitting a piece inside another). The flange of the linear body may include openings configured to receive fasteners to couple the linear body to a portion of the hydraulic fracturing piping system via the openings in the flange. The second end may include male or female connectors.

The male connector of a flange may be similar to the described male connectors of the elbow. The flange may include a first body. The first body may include a first end and a second end. The second end may include a male connector. The male connector of the second end may include threads on a portion of an outer surface of the male connector. The flange body may include an internal bore disposed that extends from the first end to the second end. A nut may be disposed about the male connector and/or second end. The nut may include a base. The base of the nut may include a first aperture through the base and at least one arm extending from the base. At least a portion of the at least one arm comprises threads (e.g., configured to couple with a female connector of an other connector). The nut may include a cavity disposed between the at least one arm and the base and an opposing inner side. A retainer may be disposed between the nut and the male connector, in some implementations to inhibit the nut from uncoupling from the flange body. The retainer may include a second aperture through a base of the retainer and a portion of the second aperture may include threads configured to couple with the threads of the flange body. The retainer may be disposed in the cavity of the nut and may or may not contact an inner surface of the nut. The retainer may include a smooth exterior to rotate freely in the nut, in some implementations. Coupling the retainer to the flange body inhibits release of the nut from the body (e.g., to inhibit loss, ease coupling/uncoupling, etc.).

A female connector of the flange may be similar to the female connector of the elbow. The body of the flange proximate the female connector may include an aperture configured to receive a male connector (e.g., of an elbow, another flange, and/or other component of the hydraulic fracturing piping system). The aperture may not be threaded in some implementations, to ease mating of components. The aperture may include an inner bore and elastomeric seal(s) or other types of gasket(s) disposed in the inner bore proximate the female connector. The inner bore may include one or more recesses to receive at least a portion of the elastomeric seal(s) and/or other types of gasket(s). The elastomeric seal may at least partially compress upon insertion of a male connector (e.g., of another component) into the female connector. The elastomeric seals or other types of gaskets may inhibit leaks when a male connector is received by the aperture of the female connector in the inner bore. In some implementations, the bore may have a greater radius in the female connector than other portions of the body of the flange.

In various implementations, coupling a portion of a wellhead Christmas tree of the hydraulic fracturing piping system and a portion of the hydraulic fracturing manifold of the hydraulic fracturing piping system may be performed via a connection through a rotatable connection member system. A first end of the rotatable connection system may be coupled to a portion of a wellhead Christmas tree of the hydraulic fracturing piping system and a second end of the rotatable connection system may be coupled to a portion of the hydraulic fracturing manifold of the hydraulic fracturing piping system. The first end and the second ends of the rotatable connection system may be first ends of flanges as illustrated in FIGS. 1,7. As another nonlimiting example, a first end and/or second end may be an end (e.g., first or second end) of an elbow, as described.

To couple the rotatable connection system with elbows and flange components, at least two elbow bodies are coupled together, and a flange is coupled to one or more ends of the coupled elbows. The male and female connectors of the rotatable system (e.g., flanges and elbows) may include one or more of the described features. In some implementations, the flange(s) and elbow(s) include similar female and/or male connectors and are thus coupled in similar operations. For example, a male end of a first body (e.g., elbow or linear body) is inserted into a female end of a second body (e.g., a different elbow or linear body). If the female end of the second body includes elastomeric seal(s), the insertion of the male connector of the first body may at least partially compress the elastomeric seal(s) to inhibit leaks (e.g., of fluids flowing through connected inner bores of the first and second bodies). The nut disposed about the male connector may have threads that couple with threads on an outer surface of the female connector. Thus, the nut may be threaded at least partially onto the female connector. Since the fluid seal is provided the elastomeric seal(s) in the inner bore of the female connector of the second body. The first and second body may rotate relative to each other while maintaining this seal and while allowing the nut to maintain a coupling between the first and second bodies. Rotating at least the first body and the second body relative to each other may facilitate coupling with other components of the hydraulic fracturing piping system (e.g., rotation may facilitate tie ins to existing piping; rotation facilitate coupling the portion of a wellhead Christmas tree of the hydraulic fracturing piping system and/or the portion of the hydraulic fracturing manifold of the hydraulic fracturing piping system). In some implementations, retaining fasteners may be utilized to inhibit further rotation of the first and second body. For example, the nut may include opening(s) through which the retaining fastener(s) may be at least partially disposed to contact an outer surface of the female connector of second body. The contact may inhibit rotation of the first body relative to the second body. To allow rotation, the retaining fastener(s) may be removed, partially removed, and/or moved to not allow contact between the retaining fastener and the second body (e.g., the openings in the nuts may be threaded and the position of the retaining fastener relative to first body may depend on how far into the nut the retaining fastener is threaded). To uncouple the first body and the second body, the nut may be unthreaded to uncouple from the female connector of the first body and the male connector of the second body may be removed from the female connector. In some implementations, a retainer may be utilized with the nut and male connector to inhibit uncoupling of the nut from the first body. The retainer may be capable of being disposed in a cavity of the nut. The threads of the retainer (e.g., on at least a portion of the inner surface of the retainer) may couple with the threads on the outer surface of the male connector to dispose the nut in a position relative to the male connector. The retainer may not couple with the nut to ease positioning of the retainer on the male connector.

In various implementations, the hydraulic fracturing system may include one or more 90 degree elbows (e.g., elbows with a bore that angles approximately 90 degrees) that are configured to independently rotate. Allowing the 90 degree elbow to independently rotate may allow the ends of the elbow to be disposed in different positions to facilitate alignment of components of the piping system in the hydraulic fracturing system (e.g., of the hydraulic fracturing manifold and stack).

In various implementations, the rotatable elbow may include an internal radial transition. The internal radial transition may be approximately 90 degrees. The internal radial transition may be selected to improve one or more flow properties (e.g., uniformity of pressure, turbulence, etc.). For example, the internal radial transition may increase flow uniformity and/or decrease turbulence (e.g., when compared with conventional threaded elbows).

In various implementations, the rotatable elbow may have an internal radial transition selected to product life (e.g., lengthen the time before mechanical failure). In some implementations, erosion of the internal bore of the rotatable elbow and/or assembly may be decreased by the selected internal radial transition of the rotatable elbow. For example, the internal radial transition of the elbow may be smooth to significantly reduce erosion (e.g., when compared with conventional threaded elbows).

In some implementations, the body of the various shown components may be approximately radially symmetric about the internal bore.

Although retaining screws have been described, other appropriate types of retaining fastener systems may be utilized, such as spring loaded pins, etc. In some implementations, a female connector of a rotatable connecting member may include retaining fastener systems that are contact and couple with the threaded nut of the male connector of another rotatable connecting member.

Although one or more of the described elbows include a second end that includes a female connector capable of coupling with a male connector and/or threaded nut, implementations may include any appropriate second end, such as a flanged end.

Although implementations of rotatable connections have been described to include a male end with a threaded nut, implementations may include a female end with a threaded nut disposed at least partially about the female end. For example, the female end may receive a portion of a male connector end of another component (e.g., another elbow, flanged rotatable member, and/or other component of the piping system) and the threaded nut disposed about the female end may couple with threads on an external surface of the male connector and/or body of the another component, in a similar manner to the process and components described above.

Although 90 degree elbows (e.g., elbows with an internal bore that is angled at approximately 90 degrees) have been described in various implementations, implementations may include elbows with any appropriately angled internal bore. For example, 60 degree elbows, 30 degree elbows, etc. may include one or more of the described features and/or be utilized in a hydraulic fracturing piping system.

It is to be understood the implementations are not limited to particular systems or processes described which may, of course, vary. It is also to be understood that the terminology used herein is for the purpose of describing particular implementations only and is not intended to be limiting. As used in this specification, the singular forms "a", "an" and "the" include plural referents unless the content clearly indicates otherwise. Thus, for example, reference to "a protrusion" includes a combination of two or more protrusion and reference to "an elastomeric seal" includes different types and/or combinations of elastomeric seals.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A rotatable connection member system of a hydraulic fracturing piping system, wherein the rotatable connection member system comprises:
    at least two elbow bodies, wherein each elbow body comprises:
        a first body, wherein the first body comprises:
            a first end comprising a female connector;
            a second end comprising a male connector, wherein the first end and the second end of the rotatable connection member are opposing, and wherein the male connector of the second end comprises threads on a portion of an outer surface of the male connector;
        a nut comprising:

a base, wherein the base comprises a first aperture through the base;
at least one arm extending from the base, wherein at least a portion of the at least one arm comprises threads;
a cavity disposed between the at least one arm and the base;
wherein the nut is disposed about at least a portion of the male connector; and
a retainer, wherein the retainer comprises a second aperture through a base of the retainer, and wherein a portion of the second aperture comprises threads configured to couple with the threads of the body, and wherein the retainer is configured to be disposed in the cavity of the nut, and wherein coupling the retainer to the body inhibits release of the nut from the body;
and wherein the male connector of one of the elbow bodies is couplable to a female connector of one of the other elbow bodies;
a first flange member, wherein the first flange member comprises:
a first end comprising a flange female connector, wherein the flange female connector comprises:
an orifice capable of receiving one of the male connectors of one of the elbow bodies; and a threaded portion on an exterior surface of the flange female connector capable of coupling with the nut of the one of the elbow bodies; and
a second end comprising a flange; and
a second flange member, wherein the second flange member comprises:
a first end comprising a flange male connector, wherein the flange male connector is capable of being received by the female connector of one of the elbow connectors; and
wherein the first flange comprises:
a flange nut comprising:
a base, wherein the base comprises a third aperture through the base;
at least one arm extending from the base, wherein at least a portion of the at least one arm comprises threads;
a cavity disposed between the at least one arm and the base;
wherein the nut is disposed about at least a portion of the flange male connector of the second flange; and
a flange retainer, wherein the flange retainer comprises a fourth aperture through a base of the retainer, and wherein a portion of the fourth aperture comprises threads configured to couple with the threads of the body, and wherein the flange retainer is configured to be disposed in the cavity of the nut, and wherein coupling the flange retainer to the male connector of the second flange inhibits release of the nut from the second flange;
a second end comprising a flange;
wherein the rotatable connection member system is capable of mating a portion of a wellhead Christmas tree of the hydraulic fracturing piping system and a portion of the hydraulic fracturing manifold of the hydraulic fracturing piping system together via the flanges of the first flange member and the second flange member;
and wherein an internal bore extends from the first flange to the second flange when the first flange, second flange, and the two or more elbow bodies are attached.

2. A rotatable connection member system of claim 1 wherein the flange of the first flange member comprises openings configured to receive fasteners to couple the first flange member to a portion of the hydraulic fracturing piping system via the openings in the flange of the first flange member.

3. A rotatable connection member system of claim 1 wherein the at least two elbow bodies comprise a third elbow body coupled to one of the elbow bodies.

4. The rotatable connection member system of claim 1 further comprising one or more retainer fasteners; wherein the nut of at least one of the second flange or the two or more elbow bodies comprises one or more openings configured to receive the one or more retainer fasteners, and wherein the one or more retainer fasteners are capable of inhibiting movement of a coupled component of the hydraulic fracturing piping system.

5. The rotatable connection member system of claim 4 wherein the component of the hydraulic fracturing piping system comprises at least one of:
one of the elbow bodies or the first flange.

6. The rotatable connection member system of claim 5 wherein at least one of the female connectors or the female flange connector comprises one or more elastomeric seal members to inhibit leaks from fluid flow.

7. The rotatable connection member system of claim 1 wherein the internal bore comprises internal bores of each component of the rotatable connection member system coupled together to allow fluid flow.

8. A method of coupling a portion of a wellhead Christmas tree of the hydraulic fracturing piping system and a portion of the hydraulic fracturing manifold of the hydraulic fracturing piping system via a rotatable connection member system, the method comprising:
coupling at least two elbow bodies together, wherein each elbow body comprises:
a first body, wherein the first body comprises:
a first end comprising a female connector;
a second end comprising a male connector, wherein the first end and the second end of the rotatable connection member are opposing, and wherein the male connector of the second end comprises threads on a portion of an outer surface of the male connector;
a nut comprising:
a base, wherein the base comprises a first aperture through the base;
at least one arm extending from the base, wherein at least a portion of the at least one arm comprises threads;
a cavity disposed between the at least one arm and the base;
wherein the nut is disposed about at least a portion of the male connector; and
a retainer, wherein the retainer comprises a second aperture through a base of the retainer, and wherein a portion of the second aperture comprises threads configured to couple with the threads of the body, and wherein the retainer is configured to be disposed in the cavity of the nut, and wherein coupling the retainer to the body inhibits release of the nut from the body;

and wherein the male connector of one of the elbow bodies is couplable to a female connector of one of the other elbow bodies;

coupling a first flange member to one of the elbow bodies, wherein the first flange member comprises:
- a first end comprising a flange female connector, wherein the flange female connector comprises:
  - an orifice capable of receiving one of the male connectors of one of the elbow bodies; and a threaded portion on an exterior surface of the flange female connector capable of coupling with the nut of the one of the elbow bodies; and
- a second end comprising a flange; and coupling a second flange member to another one of the elbow bodies, wherein the second flange member comprises:
- a first end comprising a flange male connector, wherein the flange male connector is capable of being received by the female connector of one of the elbow connectors; and wherein the first flange comprises:
- a flange nut comprising:
  - a base, wherein the base comprises a third aperture through the base;
  - at least one arm extending from the base, wherein at least a portion of the at least one arm comprises threads;
  - a cavity disposed between the at least one arm and the base;
  - wherein the nut is disposed about at least a portion of the flange male connector of the second flange; and
- a flange retainer, wherein the flange retainer comprises a fourth aperture through a base of the retainer, and wherein a portion of the fourth aperture comprises threads configured to couple with the threads of the body, and wherein the flange retainer is configured to be disposed in the cavity of the nut, and wherein coupling the flange retainer to the male connector of the second flange inhibits release of the nut from the second flange;
- a second end comprising a flange; and coupling a portion of a wellhead Christmas tree of the hydraulic fracturing piping system and a portion of the hydraulic fracturing manifold of the hydraulic fracturing piping system together via the flanges of the first flange member and the second flange member;

wherein an internal bore extends from the first flange to the second flange when the first flange, second flange, and the two or more elbow bodies are attached.

9. The method of claim 8 further comprising tightening one or more retainer screws to inhibit movement, wherein one or more retainer screws are disposed through at least one of the nut or the flange nut.

10. The method of claim 8 further comprising rotating at least one of the first flange or the second flange to couple the portion of a wellhead Christmas tree of the hydraulic fracturing piping system and the portion of the hydraulic fracturing manifold of the hydraulic fracturing piping system together via the first flange and the second flange.

* * * * *